United States Patent [19]
Dörr

[11] Patent Number: 5,113,902
[45] Date of Patent: May 19, 1992

[54] CONTROL VALVE FOR MEDIA IN VAPOR OR LIQUID FORM

[75] Inventor: Hermann Dörr, Herzogenaurach, Fed. Rep. of Germany

[73] Assignee: Siemens Aktiengesellschaft, Munich, Fed. Rep. of Germany

[21] Appl. No.: 768,377

[22] Filed: Sep. 27, 1991

[30] Foreign Application Priority Data

Sep. 29, 1990 [DE] Fed. Rep. of Germany ....... 4030903
Dec. 19, 1990 [DE] Fed. Rep. of Germany ....... 4040701

[51] Int. Cl.$^5$ ............................................. F16K 11/22
[52] U.S. Cl. .............................. 137/556; 137/630.13; 137/630.15
[58] Field of Search ...................... 137/556, 599.2, 630, 137/630.14, 630.15, 630.13

[56] References Cited

U.S. PATENT DOCUMENTS

| 2,160,657 | 5/1939 | Haynes . | |
|---|---|---|---|
| 2,213,488 | 9/1940 | Dowrick | 137/630.15 |
| 3,580,288 | 5/1971 | Schuder | 137/630.13 |
| 4,041,979 | 8/1977 | Grotloh | 137/599.2 |
| 4,375,821 | 3/1983 | Nanao . | |
| 4,834,133 | 5/1989 | LaCoste et al. . | |

FOREIGN PATENT DOCUMENTS

| 1144984 | 3/1963 | Fed. Rep. of Germany . |
|---|---|---|
| 2005592 | 8/1970 | Fed. Rep. of Germany . |
| 1916876 | 8/1974 | Fed. Rep. of Germany . |
| 672462 | 4/1929 | France . |

Primary Examiner—Robert G. Nilson
Attorney, Agent, or Firm—Herbert L. Lerner; Laurence A. Greenberg

[57] ABSTRACT

A control valve assembly having spindle actuation for media in vapor or liquid form includes a main valve having a main valve seat. A control valve has a main throttle body cooperating with the main valve seat for opening and closing the main valve. The control valve has an associated main spindle for transmitting thrust forces to the main throttle body. An auxiliary valve has an auxiliary valve seat. The control valve has an auxiliary throttle body cooperating with the auxiliary valve seat for opening and closing the auxiliary valve. The control valve has an associated auxiliary spindle for transmitting the thrust forces to the auxiliary throttle body. A common spindle actuator supplies control forces for the main spindle and the auxiliary spindle. First and second spring-elastic couplings respectively transmit the control forces to the main and auxiliary throttle bodies. The main and auxiliary spindles are adapted for causing the main throttle body to close before the auxiliary throttle body reaches the auxiliary valve seat in a closing operation, and for causing the auxiliary throttle body to open before the main throttle body leaves the main valve seat in an opening operation.

26 Claims, 2 Drawing Sheets

CONTROL VALVE FOR MEDIA IN VAPOR OR LIQUID FORM

The invention relates to a control valve for media in vapor or liquid form, having spindle actuation.

In process and power plant technology, it is known that pressure-relieved control elements are often used to reduce the necessary positioning forces in gaseous media. Two variants are essentially used:

1. A version with permanent relief, in which the pressure relief is typically achieved through a bore passing through a throttle body that connects a low-pressure chamber with a pressure relief chamber. The major disadvantage of such a version is that there is permanent leakage flowing through the relief bore. Additional tightly closing shutoff devices must often be installed as a result.

2. A version with controlled pressure relief, in which the pressure relief is attained by actuating a second control element that is typically outside the primary control element. Aside from the additional pressure relief control element, such a version also requires pipelines, with the attendant labor of assembly and testing as well as considerable expenditure for process technology. Since the primary control element is also impaired if there is a malfunction in the region of the pressure relief control element, a reduction in total availability must be expected. Leakage never or virtually never occurs in the second variant.

It is accordingly an object of the invention to provide a control valve for media in vapor or liquid form with spindle actuation, which overcomes the hereinafore-mentioned disadvantages of the heretofore-known devices of this general type and with which it is possible to use a single spindle actuator to actuate two valve spindles with associated throttle bodies at the correct time, in such a way that first, the advantage of pressure relief (small control forces), and second, a tightly closing valve in the closing position in each case, are assured.

With the foregoing and other objects in view there is provided, in accordance with the invention, a control valve assembly having spindle actuation for media in vapor or liquid form, comprising a main valve having a main valve seat, a main throttle body cooperating with the main valve seat for opening and closing the main valve, and an associated main spindle for transmitting thrust forces to the main throttle body; an auxiliary valve having an auxiliary valve seat, an auxiliary throttle body cooperating with the auxiliary valve seat for opening and closing the auxiliary valve, and an associated auxiliary spindle for transmitting the thrust forces to the auxiliary throttle body; a common spindle actuator supplying control forces for the main spindle and the auxiliary spindle, first and second spring-elastic couplings for respectively transmitting the control forces to the main and the auxiliary throttle bodies; and the main and auxiliary spindles having means or being adapted to one another for causing the main throttle body to close before the auxiliary throttle body reaches the auxiliary valve seat in a closing operation, and for causing the auxiliary throttle body to open before the main throttle body leaves the main valve seat in an opening operation.

The double spindle control according to the invention, in cooperation with a controlled pressure relief, attains the advantage of pressure relief (low control forces) with a simultaneous requirement for tightly closing valves without additional relief valves, pipelines, actuator mechanisms, or means for triggering them and supplying energy to them.

In accordance with another feature of the invention, the control valve has a pressure relief chamber, an inflow side, and an outflow side; the main throttle body has a pressure relief conduit system with a main conduit connecting the pressure relief chamber to the outflow side in an opened state, and the main throttle body has a rear, piston-like part; and the pressure relief chamber is a housing chamber constructed as a piston chamber with an annular wall on which the rear, piston-like part is guided; and there are provided first subsidiary conduits for removing water and through which the pressure relief chamber permanently communicates with the inflow side, and second subsidiary conduits for relieving pressure and through which the pressure relief chamber communicates with the outflow side only when the main conduit is opened.

In accordance with a further feature of the invention, the auxiliary valve seat is part of the main throttle body, the main conduit is closed by the auxiliary throttle body after closure of the main valve by the main throttle body, and a closing force acting on the main throttle body is increased as a result of an inflow-side pressure building up in the pressure relief chamber, and the main conduit is opened by the auxiliary throttle body prior to opening the main valve by the main throttle body, and an opening motion of the main throttle body is facilitated by a disappearance of compressive forces counteracting it, by pressure dropping in the pressure relief chamber to a value being substantially equal to an outflow-side pressure.

In accordance with an added feature of the invention, the auxiliary throttle body and the auxiliary spindle are coaxially and longitudinally displaceably supported inside the main spindle of the main throttle body.

In accordance with an additional feature of the invention, there is provided a drive member through which the common spindle actuator moves the main and auxiliary spindles.

In accordance with yet another feature of the invention, the drive member is coupled to the main spindle through the first spring-elastic coupling and to the auxiliary spindle through the second spring-elastic coupling.

In accordance with yet a further feature of the invention, there is provided a length adjusting device for the auxiliary spindle, the length adjusting device being disposed between the drive member and the second spring-elastic coupling.

In accordance with yet an added feature of the invention, there are provided piston rings seated in annular grooves formed in the rear, piston-like part of the main throttle body, the annular wall of the housing chamber having an inner periphery, and the main throttle body being sealingly guided on the inner periphery of the annular wall by the piston rings.

In accordance with yet an additional feature of the invention, the main spindle has a shaft part carrying the main throttle body, the auxiliary throttle body is constructed as a tappet, the shaft part has a central axial blind bore formed therein in which the auxiliary throttle body is longitudinally displaceably movable; the auxiliary throttle body has a conical end, the blind bore has a conical bottom forming the auxiliary valve seat with a conical shape corresponding to the conical end; and the main conduit is extended from the bottom of the conical auxiliary valve seat through the main throttle body as far as the outflow side.

In accordance with again another feature of the invention, the first subsidiary conduits for removing water permanently connect the pressure relief chamber with the inflow side in the vicinity of the conical auxiliary valve seat, and the second subsidiary conduits connect the pressure relief or equalization chamber with the bottom of the blind bore in the vicinity of the conical auxiliary valve seat, so that a connection between the second subsidiary conduits and the main conduit is blocked in a closing position of the auxiliary throttle body but is uncovered upon a short opening stroke of the auxiliary throttle body.

In accordance with again a further feature of the invention, there is provided a valve housing, a valve yoke, an intermediate piece disposed between the valve housing and the valve yoke, a shaft part of the main throttle body, and a gland through which the shaft part is passed in a sealing and sliding manner, the annular wall of the housing chamber tightly guiding the rear, piston-like part of the main throttle body being seated on the intermediate piece, and the intermediate piece having a central annular collar portion forming a bearing for the gland.

In accordance with again an added feature of the invention, the shaft part of the main throttle body adjoins the blind bore for the auxiliary throttle body and has an expanded hollow chamber formed therein, and the auxiliary spindle and the second spring-elastic coupling are movable in a reciprocation direction inside the hollow chamber.

In accordance with again an additional feature of the invention, the auxiliary spindle has a lower part and an upper part with a reinforced cap part, the second spring-elastic coupling has a spring basket with a prestressed compression spring assembly, in particular a cup spring assembly, and a basket lid, the spring basket is seated on the lower part of the auxiliary spindle, and the upper part of the auxiliary spindle is supported with the reinforced cap part being longitudinally displaceable inside the spring basket, being loaded by the compression spring assembly, and being caught by the basket lid.

In accordance with still another feature of the invention, the valve yoke has a peripheral wall with longitudinal slits formed therein, and there are provided laterally protruding roller arms guiding the main spindle in the longitudinal slits in a reciprocation direction, for securing the main spindle against twisting and for indicating its stroke.

In accordance with still a further feature of the invention, the auxiliary spindle has a maximum stroke being approximately equivalent to half a spring deflection travel of the first spring-elastic coupling of the main spindle, when the first spring-elastic coupling is not yet pressed inward.

The spindle actuator according to the invention can be actuated both by a linear actuator and by a rotary actuator.

For the first version, in accordance with still an added feature of the invention, the common spindle actuator is a linear actuator, the drive member is a piston rod having an annular flange, and the first spring-elastic coupling has a spring basket with a basket housing having a basket bottom and a basket lid, and a prestressed compression spring supported in the basket housing, the compression spring having one end supported on the basket bottom and another end supported on the annular flange, the annular flange being caught in the basket housing by the basket lid.

In accordance with still an additional feature of the invention, the compression spring is a prestressed cup spring assembly.

In accordance with another feature of the invention, the linear actuator is a hydraulic piston/cylinder system.

For the second version, in accordance with a further feature of the invention, the common spindle actuator is a rotary actuator, and there is provided a spindle nut configuration being rotatable by the rotary actuator for imparting a motion in a reciprocation direction to both the main spindle and the auxiliary spindle, the first spring-elastic coupling assigned to the main spindle and the second spring-elastic coupling assigned to the auxiliary spindle permitting an axial relative motion of the main and the auxiliary spindles.

In accordance with an added feature of the invention, the spindle nut configuration includes first and second spindle nuts being axially spaced apart and defining an axial interspace therebetween; the first spindle nut having a guide shaft, the first spindle nut being connected to and fixed against rotation relative to the spindle actuator, and the first spindle nut having an internal thread forming a screw bearing for torsionally secured axial motion of the auxiliary spindle; the second spindle nut being supported and secured against rotation relative to but axially displaceable on the guide shaft: the first spring-elastic coupling being disposed in the axial interspace; and the second spindle nut having a threaded shaft forming a screw bearing for torsionally secured axial motion of the main spindle.

In accordance with an additional feature of the invention, the first spring-elastic coupling is a prestressed compression spring assembly, in particular a prestressed cup spring assembly.

In accordance with yet another feature of the invention, the thread pitches of the first spindle nut and the auxiliary spindle screw-supported in the first spindle nut are equal to the thread pitches of the second spindle nut and the main spindle screw-supported on the second spindle nut.

In accordance with a concomitant feature of the invention, there is provided a gland, the auxiliary spindle having an upper part and a lower part with the tappet-like auxiliary throttle body, the blind bore in the shaft part of the main throttle body having an end region, and the tappet-like auxiliary throttle body passing sealingly and slidingly through the gland at the end region of the the blind bore.

Other features which are considered as characteristic for the invention are set forth in the appended claims.

Although the invention is illustrated and described herein as embodied in a control valve for media in vapor or liquid form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
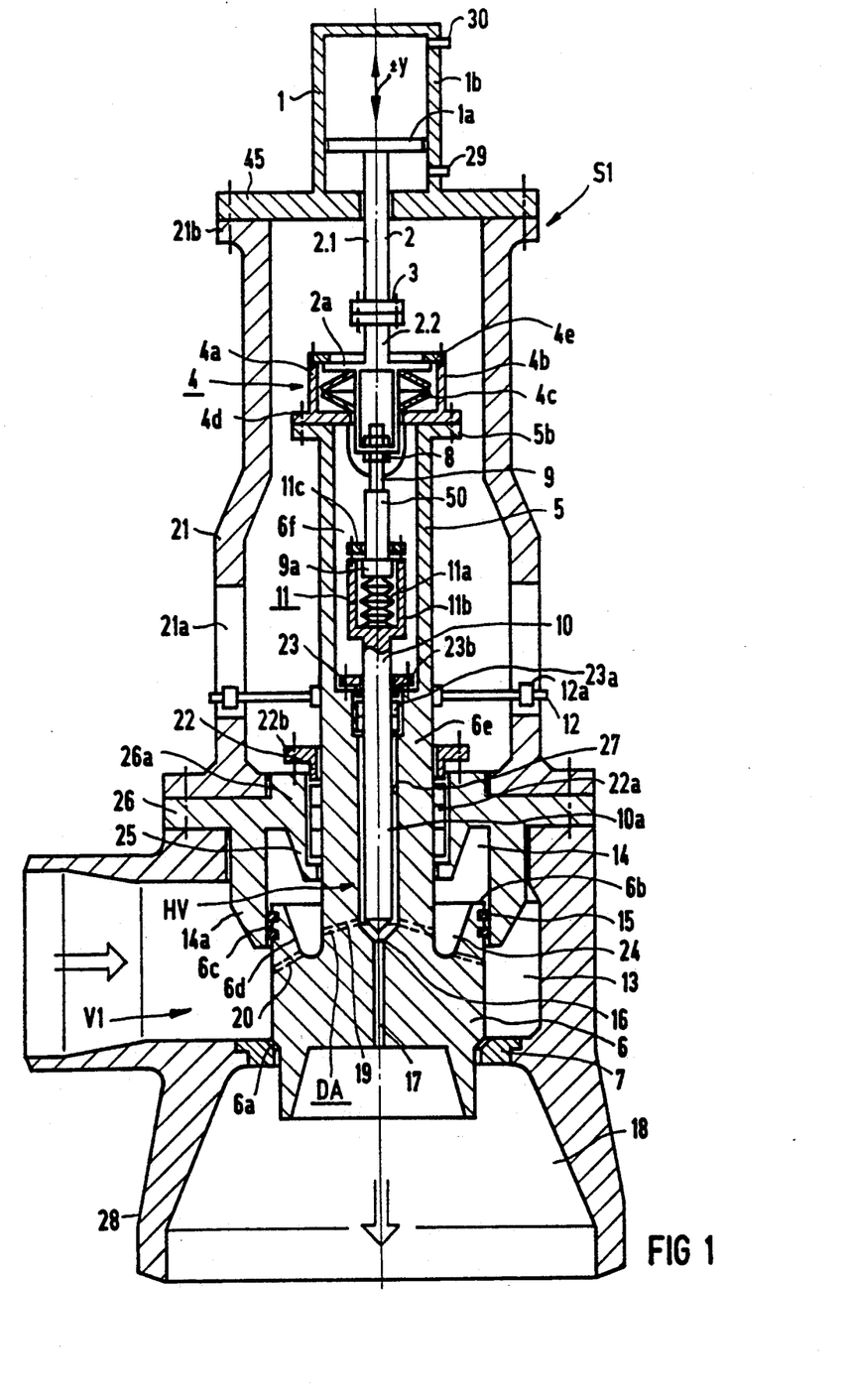
FIG. 1 is an axial section taken through a valve housing of a first exemplary embodiment of a control valve according to the invention with a linear actuator.

Referring now to the figures of the drawing in detail and first, particularly, to FIG. 1 thereof, there is seen a basic structure of a control valve having double-spindle control, controlled pressure relief and a linear actuator 1 as a common spindle actuator. In principle, the linear actuator 1 may be a hydraulic, pneumatic or electric actuator mechanism. The preferred embodiment of a hydraulic actuator is shown. A linear actuator 1 actuates a main spindle 5 with a main throttle body 6 through a piston rod or drive member 2, a coupling 3, and a first spring-elastic coupling 4 having a prestressable spring basket 4a. The main throttle body 6 has a sealing surface 6a, which in particular is conically shaped. In a closed state, the sealing surface 6a is pressed against a corresponding mating surface of a main valve seat 7. An auxiliary upper spindle part 9 is rigidly secured to the coupling 3 by a length adjusting device 8. An auxiliary spindle is identified as a whole by reference numeral 50. A second spring-elastic coupling 11, in the form of a prestressed cup spring package 11a, is located between the upper part 9 and a lower part 10 of the auxiliary spindle. Located on the main spindle 5 is a reciprocation position display and torsion preventing means 12, in the form of radially protruding roller arms that are joined to the main spindle 5 in such a manner as to be fixed against relative rotation. Rollers of the roller arms 12, which are movable axially parallel to a reciprocation direction ±y in corresponding longitudinal slits 21a in a valve yoke 21, are identified by reference numeral 12a.

An outlet of an auxiliary seat 16, which is closable by an auxiliary throttle body 10a, communicates through a main conduit 17 of a pressure relief conduit system DA with an outflow side 18 of a control valve S1. This outflow side 18 may also be referred to as a valve outlet chamber or low-pressure chamber. A pressure relief chamber 14 can be made to communicate permanently with an inflow side 13 of the control valve S1 through first subsidiary conduits 20 serving to remove water, and also through second subsidiary conduits 19 serving to relieve pressure only when the main channel 17 is open to the outflow side 18 of the control valve S1. The conduits 17, 19, 20 are preferably constructed as bores. As noted, the subsidiary conduits 20 serve to divert condensate out of the pressure relief chamber 14. The inflow side 13 can also be referred to as the valve inlet chamber or high-pressure chamber.

The pressure relief chamber 14 is a housing chamber which is constructed as a piston chamber. A rear, piston-like part 6b of the main throttle body 6 is guided on an annular wall 14a of the pressure relief chamber 14. Piston rings 15 are inserted into corresponding annular grooves 6c in the outer periphery of the piston-like part 6b. The piston rings rest on corresponding sealing surfaces on the inner periphery of the annular wall 14a. Besides functioning as a seal, this piston ring seal has the function of guiding the throttle body 6 in the reciprocation direction ±y between the inflow side 13 and the pressure relief or equalization chamber 14.

In order to explain the mode of operation, the presetting of the auxiliary spindle 5 will first be described. When the first spring-elastic coupling 4, in the preferred embodiment of the spring basket 4a, is not pressed in, or in other words the position of the main spindle 5 is greater than 0%, a maximum stroke (spacing between the auxiliary seat 16 and the auxiliary spindle 50 of the auxiliary spindle 50 is set through the length adjusting device 8. This stroke is approximately equivalent to half the spring deflection travel of the first elastic coupling member 4.

Function in closing direction:

For purposes of explaining the starting situation, it is assumed that the linear actuator 1, the main spindle 5 and the main throttle body 6 are located in an upper or intermediate position. In that case, the prestressed spring basket 4a of the first spring-elastic coupling 4 and the prestressed cup spring package or springs 11a of the second spring-elastic coupling 11, are stretched. The auxiliary spindle 50 has assumed the preset maximum stroke. In other words, the pressure relief chamber 14 communicates with the outflow side 18 through the second subsidiary conduits 19 and the main conduit 17.

If the linear actuator then moves the main spindle 5 having the main throttle body 6 in the closing direction −y, then the relative position of the auxiliary spindle 50 with respect to the main spindle 5 is maintained until the position for closing is reached, or in other words until the main throttle body 6 is seated on the main valve seat 7. It is not until spring deflection of the spring basket 4a of the first spring-elastic coupling 4, that the lower part 10 of the auxiliary spindle is moved toward the auxiliary valve seat 16, until finally, at half the spring deflection travel of the spring basket 4a of the first spring-elastic coupling 4, the lower part 10 of the auxiliary spindle is pressed firmly against the auxiliary valve seat 16. Upon further compression of the spring basket 4a, the prestressed cup springs of the cup spring package 11a are then compressed as well. The lower part 10 of the auxiliary spindle is pressed into the auxiliary valve seat 16 with the spring force of the cup spring package 11a, as a result of which the communication between the pressure relief chamber 14 and the outflow side 18 is blocked.

In the pressure relief chamber 14, the pressure of the inflow side 13 then builds up through the piston rings 15 and the first subsidiary conduits 20, and additionally presses against the main valve seat 7, through the effective surface area of the main throttle body 6. The tightly-closing state is thus attained.

Function in opening direction:

The tightly-closing state is assumed in this case, in which not only is the main throttle body 6 seated on its main valve seat 7, but the auxiliary throttle body 10a is also seated on its auxiliary valve seat 16. As soon as the piston rod 2 moves in the opening direction +y, the relaxation of the spring basket 4a and the cup springs 11a begins. Once the spring basket 4a has relaxed approximately halfway, the lower part 10 of the auxiliary spindle begins to lift its auxiliary throttle body 10a from the auxiliary valve seat 16, and opens the communication between the pressure relief chamber 14 and the outflow side 18 through the main conduit 17.

This lowers the pressure in the pressure relief chamber 14 to a value that is only slightly above the pressure of the outflow side 18. It is not until the spring basket 4a is fully stretched that the opening motion of the main valve spindle 5 and the main throttle body 6 begin. In the opening process, it is essentially only the forces of friction of a gland 22 of the main spindle 5 and the forces of friction at the piston rings 15 and, aside from the force of gravity, the force resulting from the difference between the pressure in the pressure relief chamber 14 and on the outflow side 18, multiplied by the effective cross section of the main throttle body 6, that has to be overcome by the linear actuator 1. From FIG. 1 and the above description, it will be appreciated that the control valve S1 has the one main throttle body 6 for opening and closing a main valve V1, and the associated main spindle 5 for transmitting the thrust forces to the main throttle body 6. The control valve S1 also has the auxiliary throttle body 10a for opening and closing an auxiliary valve HV, along with the associated auxiliary spindle 50 for transmitting the thrust forces to the auxiliary throttle body 10a. The control forces of the joint spindle actuator 1 for the main spindle 5 and the auxiliary spindle 50 can be transmitted through the respective first and second spring-elastic couplings 4 and 11 to the main and the auxiliary throttle bodies 6, 10a. The two spindles 5, 50 are adapted to one another in such a way that during the closing process, the main throttle body 6 closes before the auxiliary throttle body 10a closes its auxiliary valve. The adaptation is also performed in such a way that during the opening process, the auxiliary throttle body 10a already opens its auxiliary valve before the main throttle body 6 opens its main valve.

The main throttle body 6 has the pressure relief conduit system DA with the main conduit 17. In the opened state, the main conduit 17 connects the pressure relief chamber 14 to the outflow side 18 of the control valve S1. As mentioned above, the pressure relief chamber 14 is a housing chamber that is constructed as a piston chamber with the annular wall 14a on which the rearward piston-like part 6b of the main throttle body 6 is guided. The first and second subsidiary conduits 20 and 19, respectively, have already been described. The auxiliary valve seat 16 is part of the main throttle body 6. Therefore:

a) the main conduit 17 is closeable by means of the auxiliary throttle body 10a after the closure of the main valve V1 by the main throttle body 6, and thus as a result of the inflow-side pressure building up in the pressure relief chamber 14, the closing force acting upon the main throttle body 6 is increased; and b) the main conduit 17 can be opened by the auxiliary throttle body 10a prior to opening the main valve V1 by the main throttle body 6, and thus by means of the pressure dropping in the pressure relief chamber 14 to a value that is virtually equal to the outflow-side pressure, the opening motion of the main throttle body 6 is facilitated by the disappearance of pressure forces counteracting it.

A particularly compact configuration is attainable by providing that the auxiliary throttle body 10a with its auxiliary spindle 50, or in other words with the lower part 10 and upper part 9 of the auxiliary spindle, is supported coaxially and longitudinally displaceably inside the main spindle 5 of the main throttle body 6, as shown. As noted, the main and auxiliary spindles 5, 50 are movable through a common drive member, which is the piston rod 2, by the common spindle actuator 1. This is achieved in a particularly advantageous way by providing that the drive member 2 of the spindle actuator 1 is coupled to the main spindle 5 by the first spring-elastic coupling 4 and to the auxiliary spindle 50 by the second spring-elastic coupling 11. In order to provide precise adaptation of the closing forces and of the closing and opening movements, the length adjusting device 8 for the auxiliary spindle 50 is introduced between the drive member 2 and the second spring-elastic coupling 11.

An annular chamber 24 formed by a hollow throat on the back of the main throttle body 6 is adapted to the contour of a protrusion 25 of an intermediate piece 26, and thus enables the necessary opening travel of the main throttle body 6 even with a compact structure. Moreover, this structure forms elastic piston flanks or lateral surfaces 6d, which is advantageous for the sealing sliding fit of the piston rings 15.

In order to construct the auxiliary valve, which is identified as a whole by reference symbol HV, a shaft part 6e of the main spindle 5 carrying the main throttle body 6 has a central, axial blind bore 27 formed therein, in which the auxiliary throttle body 10a, that is constructed as a tappet, is longitudinally displaceably movable. The conical auxiliary valve seat 16 is formed at the bottom of the blind bore 27 in order to accommodate the auxiliary throttle body 10a, the end of which is correspondingly conically constructed. The main conduit 17 is extended from the bottom of the conical auxiliary valve seat 16 through the main throttle body 6 and all the way to the outflow side 18. It can be seen that the subsidiary conduits include the first subsidiary conduits 20, which permanently connect the pressure relief chamber 14 to the inflow side 13, and the second subsidiary conduits 19 which connect the pressure equalization chamber 14 to the bottom of the blind bore 27, in each case at a point that is located near or in the region of the conical auxiliary valve seat 16 of the auxiliary throttle body 10a. In this way, a connection of the second subsidiary conduits 19 with the main conduit 17 is blocked in the closing direction of the auxiliary throttle body 10a but is uncovered upon a short opening stroke of the auxiliary throttle body 10a. The cross section of the conduits 19 and 17 is substantially larger than the cross section of the subsidiary conduits 20, so that the pressure reduction in the pressure relief chamber 14 will be as great as possible.

The annular wall 14a of the housing chamber or pressure relief chamber 14 that sealingly guides the piston flank or rear part 6d of the main throttle body 6, is seated on the intermediate piece 26 which is introduced between a valve housing 28 and the valve yoke 21. The intermediate piece 26 forms a bearing for the gland 22, with a central annular collar part 26a on which the protrusions 25 are also seated. The shaft part 6e of the main throttle body 6 is guided sealingly and slidingly through the gland 22, which includes a gland packing 22a and a closure lid 22b.

As can be seen, the shaft part 6e of the main spindle 5 adjoining the blind bore 27 for the auxiliary throttle body 10a is provided with a widened hollow chamber 6f, in which the auxiliary spindle 50 with its second spring-elastic coupling 11 is movable in the reciprocation direction ±y. The second spring-elastic coupling 11 is preferable constructed with a spring basket 11b and a prestressed compression spring assembly, in particular a cup spring assembly in the form of the cup spring package 11a. The spring basket 11b is seated on the lower part 10 of the auxiliary spindle. The upper part 9 of the auxiliary spindle is longitudinally displaceably supported and loaded by the cup spring packet or package 11a inside the spring basket 11b by a reinforced cap part 9a, and is caught by a basket lid 11c.

The spring basket embodiment is also advantageous for the first spring-elastic coupling 4 of the main spindle.

FIG. 1 shows that with the illustrated linear actuator 1 as the spindle actuator and with the piston rod 2 as the drive member, the first spring-elastic coupling 4 is constructed with the spring basket 4a, having a prestressed cup spring assembly 4c in the form of a cup spring package supported in a basket housing 4b. The cup spring package 4c is supported at one end on a basket bottom 4d and at the other on an annular flange 2a of the piston rod 2. The annular flange 2a in turn is caught in the basket housing 4b by means of a basket lid 4e. For the sake of better assembly, the piston rod 2 is subdivided by the coupling 3, producing respective upper and lower piston rod parts 2.1 and 2.2.

The linear actuator 1 is constructed as a hydraulic piston/cylinder system, having a piston 1a and a cylinder housing 1b, as well as hydraulic line connections 29 and 30.

Corresponding to the gland 22 for the shaft part 6e of the main spindle 5, the auxiliary spindle 50 with its tappet-like auxiliary throttle body 10a is slidingly and sealingly passed through a gland 23, which includes a seal packing 23a and a closure lid 23b.

Figure 2:
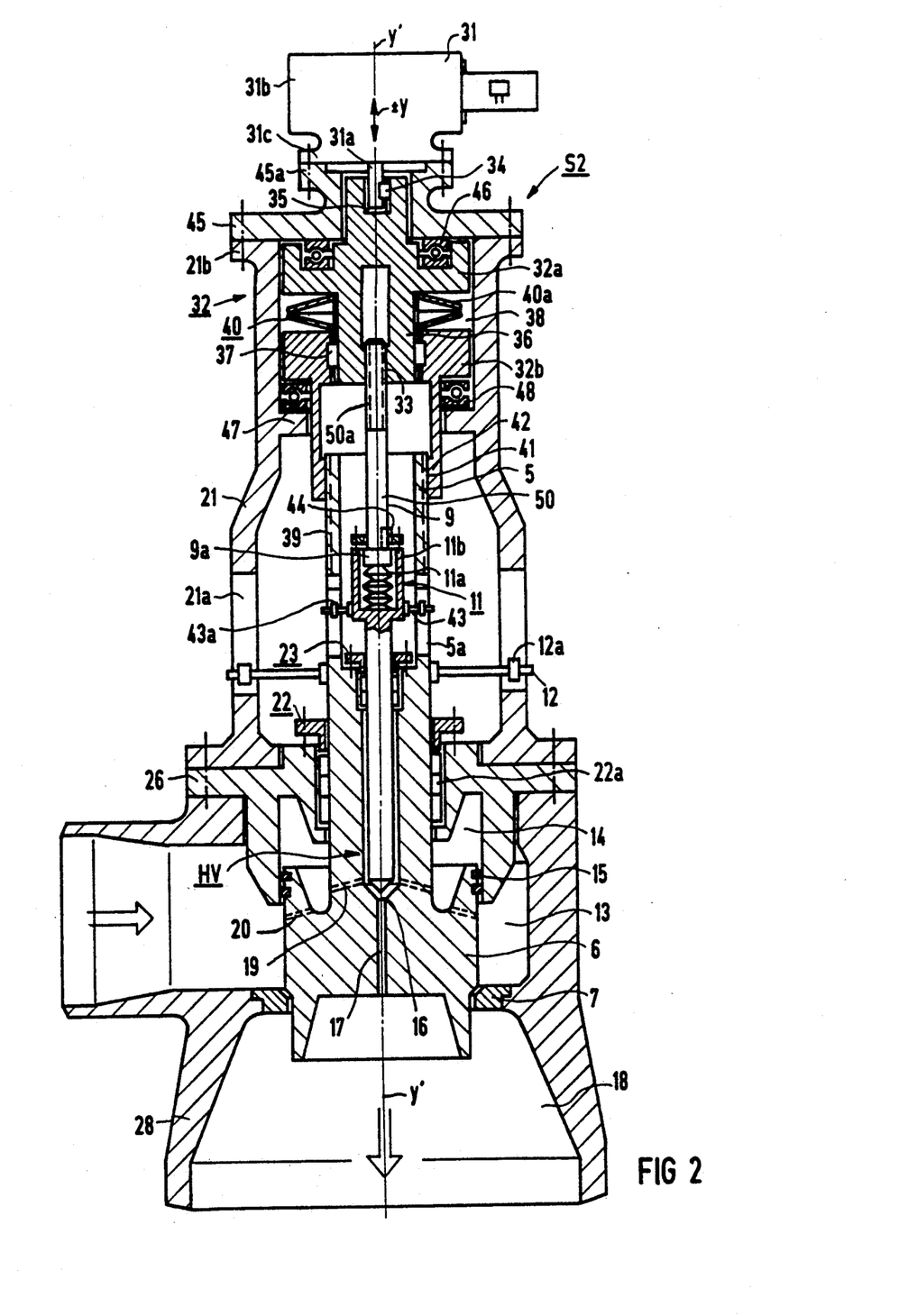
FIG. 2 is a view similar to FIG. 1 showing a second exemplary embodiment of a control valve according to the invention having a rotary actuator.

In the second exemplary embodiment of FIG. 2, a spindle actuator 31 of a control valve S2 is a rotary actuator, having a spindle nut configuration 32. Rotation of the spindle nut configuration 32 imparts a motion, in this case in the reciprocation direction ±y, to the main spindle 5 and the auxiliary spindle 50. An axial relative motion of the two spindles 5, 50 is enabled by means of a first spring-elastic coupling 40 assigned to the main spindle 5, and the second spring-elastic coupling 11 assigned to the auxiliary spindle 50.

The second exemplary embodiment of FIG. 2 which has a rotary actuator, will be described below only to the extent that it differs from the first exemplary embodiment of FIG. 1 and elements having the same function otherwise carry the same reference numerals as in FIG. 1.

It can be seen from FIG. 2 that a first spindle nut 32a (upper spindle nut part) is joined to the spindle actuator 31 in such a manner as to be fixed against relative rotation and that it has an internal thread 33 which forms a screw bearing for the torsionally secured auxiliary spindle 50, in order to provide for its axial motion. In order to provide the connection in such a manner as to be fixed against relative rotation, the first spindle nut 32a is wedged to shaft journals 31a of the rotary actuator 31. A corresponding spring wedge 34 is seated in a groove formed in the inner periphery of an axial blind bore 35 in the first spindle nut 32 and engages a flat side of the shaft journal 31a or corresponding groove flanks or lateral surfaces. A second spindle nut 32b is supported in such a manner as to be fixed against relative rotation but axially displaceable on a guide shaft 36 of the first spindle nut 32a. To this end, axial grooves are provided on the outer periphery of the guide shaft 36. The grooves are engaged by the second spindle nut 32b with axial spring wedges 37 secured to the inner periphery of the second spindle nut 32b. The aforementioned first spring-elastic coupling 40 is inserted in an axial interspace 38 between the first and second spindle nuts 32a, 32b. The second spindle nut 32b has a threaded shaft 42, with which it then forms a screw bearing for the torsionally secured main spindle 5 in order to provide for its axial motion. To this end, in a preferred embodiment, the thread on the main spindle 5 is an external thread 39, and the thread on the threaded shaft 42 of the spindle nut 32b is an internal thread 41. The first spring-elastic coupling 40 is constructed as a prestressed compression spring assembly, and in particular as a prestressed cup spring assembly. Although only a two-layer cup spring package is shown, it may also be constructed in multiple layers, depending on the magnitude of the prestressing force that is necessary. The prestressed cup spring package is identified by reference numeral 40a. The pitches of the thread 33 of the first spindle nut 32a and of an outer thread 50a on the auxiliary spindle 50, on one hand, and the pitches of the thread 41 of the second spindle nut 32b and of the thread 39 of the main spindle 5 screw-supported thereon, on the other hand, are equal to one another.

Although it is not necessary in the first exemplary embodiment of FIG. 1 to provide the auxiliary spindle 50 or its spindle parts 9, 10 with torsional securing means, this is the case in the example of FIG. 2. In this case, radially protruding guide arms 43 are rigidly attached to the housing of the spring basket 11b. The housing of the spring basket 11b is firmly joined to the lower part 10 of the auxiliary spindle 50. The guide arms 43 are guided in the reciprocation direction ±y by rollers 43a that are rotatably supported on them, on a wall defined by longitudinal slits 5a formed in the main spindle 5. The roller arms 43 therefore serve the purpose of torsionally securing the lower part 10 of the auxiliary spindle. The roller arms 43 can also serve as a stroke display, because their position is visible through the guide slits or windows 21a in the yoke 21. The upper part of the auxiliary spindle is torsionally secured by means of a spring wedge 44. This wedge 44 is secured to the lid 11c of the housing 11b, and the upper part 9 of the auxiliary spindle can slide on it in the reciprocation direction ±y, through the use of a non-illustrated longitudinal groove.

A servomotor that is used for the rotary actuator 31 is preferably an electric motor, which can rotate the shaft journals 31a in both rotational directions through a non-illustrated self-inhibiting gear, in order to execute the stroke specified by the process technology, in accordance with a set-point or command value/actual value difference in both rotational directions. Through the use of the shaft journals 31a, a flange 31c of a housing 31b of the rotary actuator 31 is secured to a mating flange 45a of a cap piece 45 so as to be coaxial with an axial direction y'—y' of the spindle axes. This cap piece 45 acts as a closure lid that is screwed to an upper flange 21b of the valve yoke 21, likewise centrally relative to the valve axis y'—y'.

In the first example of FIG. 1, the cap piece 45 is integral with the housing 1b of the linear actuator 1 and is also connected to the upper flange 21b.

To return to the example of FIG. 2, it is seen that a rotary bearing 46, which may be a ball bearing or roller bearing, is inserted between the upper spindle nut 32a and the planar inner surface of the cap piece 45. Correspondingly, a further rotary bearing 48 is inserted between the lower spindle nut 32b and an inwardly projecting annular collar 47 of the valve yoke 21. These rotary bearings 46, 48 assure low-friction rotational support of the two spindle nuts 32a, 32b. The bearings 46, 48 are constructed as pressure bearings because they are exposed to the pressure of the axial control forces.

In order to describe the function of the control valve of FIG. 2, the presetting of the auxiliary spindle 50 will first be addressed. With the cup spring package 40a stretched, in other words with the position of the main spindle 5 greater than 0%, a maximum stroke (spacing between the auxiliary seat 16 and the auxiliary spindle 50) of the auxiliary spindle 50 that is equivalent to approximately half the spring deflection travel of the cup spring package 40a, is set by rotating the auxiliary spindle 50, with the torsional securing means 43, 5a loosened.

Function in closing direction:

A starting situation is assumed in which the rotary actuator 1, the main spindle 5 and the main throttle body 6 are in the opening or intermediate position. The prestressed cup spring packages 40a and 11a are stretched. The auxiliary spindle 50 has assumed the preset maximum stroke. In other words, the pressure relief chamber 14 communicates with the outflow side 18 through the second subsidiary conduits 19 and the main conduit 17. The pressure in the pressure relief chamber 14 is therefore only insubstantially greater than that on the outflow side 18 (which is dictated by the dimension of the conduit cross sections).

If the rotary actuator 31 moves the main spindle 5 and the main throttle body 6 in the closing direction −y by rotation of the spindle nuts 32a, 32b, then the relative position of the auxiliary spindle 50 with respect to the main spindle 5 is maintained until the terminal closing position, in other words until the main throttle body 6 is seated on the valve seat 7. It is not until the spring deflection of the cup spring package 40a, in other words the upward motion of the lower part 32b of the spindle nut, that the lower part 10 of the auxiliary spindle is moved in the direction of the auxiliary valve seat 16, until finally, at half the spring deflection travel of the cup spring package 40a, the lower part 10 of the auxiliary spindle is pressed first against the auxiliary valve seat 16.

Upon continued compression of the cup spring package 40a, the prestressed cup springs of the package 11a of the second spring-elastic coupling 11 are then compressed as well. The lower part 10 of the auxiliary spindle is pressed into the auxiliary valve seat 16 by the spring force of the cup springs of the package 11a, thereby blocking the connection between the pressure relief chamber 14 and the outflow side 18. Through the use of the piston rings 15 and the first subsidiary conduits 20, the pressure of the inflow side 13 then builds up in the pressure relief chamber 14, and through the effective surface area of the main throttle body 6 it additionally presses against the main valve seat 7. The tightly-closing state is thus attained.

Function in opening direction:

The starting situation will be assumed to be the above-described tightly-closing state. As soon as the rotary actuator 31 moves in the opening direction +y, the relaxation of the cup spring packages 40a and 11a begins. Once the cup spring package 40a is approximately half relaxed, the lower part 10 of the auxiliary spindle begins to lift away from the auxiliary valve seat 16 and opens the connection between the pressure relief chamber 14 and the outflow side 18. This lowers the pressure in the pressure relief chamber 14 to a value that is only slightly above the pressure of the outflow side 18. It is not until the cup spring package 40a is completely stretched that the opening motion of the main spindle 5 and the main throttle body 6 begin.

In the opening process, it is essentially only the forces of friction of the glands 22 of the main spindle 5, the forces of friction at the spindle nuts 32a, 32b and at the piston rings 15 and, besides the force of gravity, the force that arises from the differential pressure of the pressure relief chamber 14 with respect to the outflow side 18, multiplied by the effective cross section of the main throttle body 6, that have to be overcome by the rotary actuator 31.

As can be seen from a comparison of the two valve versions of FIGS. 1 and 2, the valve housing 28, the intermediate piece 26 and the valve yoke 21 are constructed identically. The main spindles 5 with their throttle bodies 6 are also identical, except for a difference at the upper end of the main spindle 5 of FIG. 1, which is hollow-cylindrical in this region, where an annular flange 5b is provided for connection to the spring basket of the first spring-elastic coupling 4. Accordingly, with one basic model, the advantageous mode of operation of the control valve according to the invention can be achieved with either a linear actuator or a rotary actuator.

I claim:

1. A control valve assembly having spindle actuation for media in vapor or liquid form, comprising:
   a) a main valve having a main valve seat, a main throttle body cooperating with said main valve seat for opening and closing said main valve, and an associated main spindle for transmitting thrust forces to said main throttle body;
   b) an auxiliary valve having an auxiliary valve seat, an auxiliary throttle body cooperating with said auxiliary valve seat for opening and closing said auxiliary valve, and an associated auxiliary spindle for transmitting the thrust forces to said auxiliary throttle body;
   c) a common spindle actuator supplying control forces for said main spindle and said auxiliary spindle, first and second spring-elastic couplings for respectively transmitting the control forces to said main and said auxiliary throttle bodies; and
   d) said main and auxiliary spindles having means for causing said main throttle body to close before said auxiliary throttle body reaches said auxiliary valve seat in a closing operation, and means for causing said auxiliary throttle body to open before said main throttle body leaves said main valve seat in an opening operation.

2. The control valve assembly according to claim 1, wherein:
   a) said control valve has a pressure relief chamber, an inflow side, and an outflow side;
   b) said main throttle body has a pressure relief conduit system with a main conduit connecting said pressure relief chamber to said outflow side in an opened state, and said main throttle body has a rear, piston-like part; and
   b) said pressure relief chamber is a housing chamber constructed as a piston chamber with an annular wall on which said rear, piston-like part is guided; and including:
   c) first subsidiary conduits for removing water and through which said pressure relief chamber permanently communicates with said inflow side, and second subsidiary conduits for relieving pressure and through which said pressure relief chamber communicates with said outflow side only when said main conduit is opened.

3. The control valve assembly according to claim 2, wherein
said auxiliary valve seat is part of said main throttle body, said main conduit is closed by said auxiliary throttle body after closure of said main valve by said main throttle body, and a closing force acting on said main throttle body is increased as a result of an inflow-side pressure building up in said pressure relief chamber, and said main conduit is opened by said auxiliary throttle body prior to opening said main valve by said main throttle body, and an opening motion of said main throttle body is facilitated by a disappearance of compressive forces counteracting it, by pressure dropping in said pressure relief chamber to a value being substantially equal to an outflow-side pressure.

4. The control valve assembly according to claim 1, wherein said auxiliary throttle body and said auxiliary spindle are coaxially and longitudinally displaceably supported inside said main spindle of said main throttle body.

5. The control valve assembly according to claim 1, including a drive member through which said common spindle actuator moves said main and auxiliary spindles.

6. The control valve assembly according to claim 5, wherein said drive member is coupled to said main spindle through said first spring-elastic coupling and to said auxiliary spindle through said second spring-elastic coupling.

7. The control valve assembly according to claim 6, including a length adjusting device for said auxiliary spindle, said length adjusting device being disposed between said drive member and said second spring-elastic coupling.

8. The control valve assembly according to claim 2, including piston rings seated in annular grooves formed in said rear, piston-like part of said main throttle body, said annular wall of said housing chamber having an inner periphery, and said main throttle body being sealingly guided on said inner periphery of said annular wall by said piston rings.

9. The control valve assembly according to claim 2, wherein said main spindle has a shaft part carrying said main throttle body, said auxiliary throttle body is constructed as a tappet, said shaft part has a central axial blind bore formed therein in which said auxiliary throttle body is longitudinally displaceably movable;

said auxiliary throttle body has a conical end, said blind bore has a conical bottom forming said auxiliary valve seat with a conical shape corresponding to said conical end; and said main conduit is extended from said bottom of said conical auxiliary valve seat through said main throttle body as far as said outflow side.

10. The control valve assembly according to claim 9, wherein said first subsidiary conduits for removing water permanently connect said pressure relief chamber with said inflow side in the vicinity of said conical auxiliary valve seat, and said second subsidiary conduits connect said pressure relief chamber with said bottom of said blind bore in the vicinity of said conical auxiliary valve seat, so that a connection between said second subsidiary conduits and said main conduit is blocked in a closing position of said auxiliary throttle body but is uncovered upon a short opening stroke of said auxiliary throttle body.

11. The control valve assembly according to claim 2, including a valve housing, a valve yoke, an intermediate piece disposed between said valve housing and said valve yoke, a shaft part of said main throttle body, and a gland through which said shaft part is passed in a sealing and sliding manner, said annular wall of said housing chamber tightly guiding said rear, piston-like part of said main throttle body being seated on said intermediate piece, and said intermediate piece having a central annular collar portion forming a bearing for said gland.

12. The control valve assembly according to claim 9, wherein said shaft part of said main throttle body adjoins said blind bore for said auxiliary throttle body and has an expanded hollow chamber formed therein, and said auxiliary spindle and said second spring-elastic coupling are movable in a reciprocation direction inside said hollow chamber.

13. The control valve assembly according to claim 1, wherein said auxiliary spindle has a lower part and an upper part with a reinforced cap part, said second spring-elastic coupling has a spring basket with a prestressed compression spring assembly and a basket lid, said spring basket is seated on said lower part of said auxiliary spindle, and said upper part of said auxiliary spindle is supported with said reinforced cap part being longitudinally displaceable inside said spring basket, being loaded by said compression spring assembly, and being caught by said basket lid.

14. The control valve assembly according to claim 13, wherein said prestressed compression spring assembly is a cup spring assembly.

15. The control valve assembly according to claim 11, wherein said valve yoke has a peripheral wall with longitudinal slits formed therein, and including laterally protruding roller arms guiding said main spindle in said longitudinal slits in a reciprocation direction, for securing said main spindle against twisting and for indicating its stroke.

16. The control valve assembly according to claim 11, wherein said valve yoke has a peripheral wall with longitudinal slits formed therein, and including laterally protruding roller arms guiding said shaft part in said longitudinal slits in a reciprocation direction, for securing said main spindle against twisting and for indicating its stroke.

17. The control valve assembly according to claim 1, wherein said auxiliary spindle has a maximum stroke being approximately equivalent to half a spring deflection travel of said first spring-elastic coupling of said main spindle, when said first spring-elastic coupling is not yet pressed inward.

18. The control valve assembly according to claim 6, wherein said common spindle actuator is a linear actuator, said drive member is a piston rod having an annular flange, and said first spring-elastic coupling has a spring basket with a basket housing having a basket bottom and a basket lid, and a prestressed compression spring supported in said basket housing, said compression spring having one end supported on said basket bottom and another end supported on said annular flange, said annular flange being caught in said basket housing by said basket lid.

19. The control valve assembly according to claim 18, wherein said compression spring is a prestressed cup spring assembly.

20. The control valve assembly according to claim 18, wherein said linear actuator is a hydraulic piston/cylinder system.

21. The control valve assembly according to claim 1, wherein said common spindle actuator is a rotary actuator, and including a spindle nut configuration being rotatable by said rotary actuator for imparting a motion in a reciprocation direction to both said main spindle and said auxiliary spindle, said first spring-elastic coupling assigned to said main spindle and said second spring-elastic coupling assigned to said auxiliary spindle permitting an axial relative motion of said main and said auxiliary spindles.

22. The control valve assembly according to claim 21, wherein said spindle nut configuration includes first and second spindle nuts being axially spaced apart and defining an axial interspace therebetween;

said first spindle nut having a guide shaft, said first spindle nut being connected to and fixed against rotation relative to said spindle actuator, and said first spindle nut having an internal thread forming a screw bearing for torsionally secured axial motion of said auxiliary spindle;

said second spindle nut being supported and secured against rotation relative to but axially displaceable on said guide shaft;

said first spring-elastic coupling being disposed in said axial interspace; and said second spindle nut having a threaded shaft forming a screw bearing for torsionally secured axial motion of said main spindle.

23. The control valve assembly according to claim 22, wherein said first spring-elastic coupling is a prestressed compression spring assembly.

24. The control valve assembly according to claim 23, wherein said prestressed compression spring assembly is a prestressed cup spring assembly.

25. The control valve assembly according to claim 22, wherein the thread pitches of said first spindle nut and said auxiliary spindle screw-supported in said first spindle nut are equal to the thread pitches of said second spindle nut and said main spindle screw-supported on said second spindle nut.

26. The control valve assembly according to claim 9, including a gland, said auxiliary spindle having an upper part and a lower part with said tappet-like auxiliary throttle body, said blind bore in said shaft part of said main throttle body having an end region, and said tappet-like auxiliary throttle body passing sealingly and slidingly through said gland at said end region of the said blind bore.

* * * * *